United States Patent [19]

Nagasaki

[11] Patent Number: 4,697,507

[45] Date of Patent: Oct. 6, 1987

[54] APPARATUS FOR PREPARATION OF A PROCESSING FOOD

[75] Inventor: Kousuke Nagasaki, Osaka, Japan

[73] Assignee: Kabushiki Kaisha Irifune, Osaka, Japan

[21] Appl. No.: 814,915

[22] Filed: Dec. 30, 1985

[30] Foreign Application Priority Data

Oct. 26, 1985 [JP] Japan .................. 60-239772
Oct. 26, 1985 [JP] Japan .................. 60-239773
Oct. 26, 1985 [JP] Japan .................. 60-239774

[51] Int. Cl.$^4$ .......................... A23B 4/00; A23L 1/00; A23D 1/00
[52] U.S. Cl. .................. 99/483; 99/443 C; 99/450.1; 99/516; 99/537
[58] Field of Search .............. 99/483, 450.1, 443 C, 99/450.2, 516, 534, 537, 324, 467, 473–476; 426/94, 289, 293, 305, 510, 511, 520; 118/16, 20, 24, 25

[56] References Cited

U.S. PATENT DOCUMENTS 4,275,647  6/1981  Chambers et al. ............... 426/94
4,556,572 12/1985  Kaufman, Jr. et al. ......... 99/483 X Primary Examiner—Timothy F. Simone
Attorney, Agent, or Firm—Fleit, Jacobson, Cohn & Price

[57] ABSTRACT

An apparatus for preparation of a processing food such as boiled fish paste, fish-noodle, eggroll or the like continuously.

This preparative apparatus of the processing food comprises a conveyor which feeds a liquid processing food material continuously, an oil coating means which coats an edible oil on the conveyor surface, a heating means which heats the conveyor to gelate the processing food on the conveyor, and a cutting means which cuts the gelated sheet-like material fed by the conveyor to a fixed shape.

8 Claims, 5 Drawing Figures

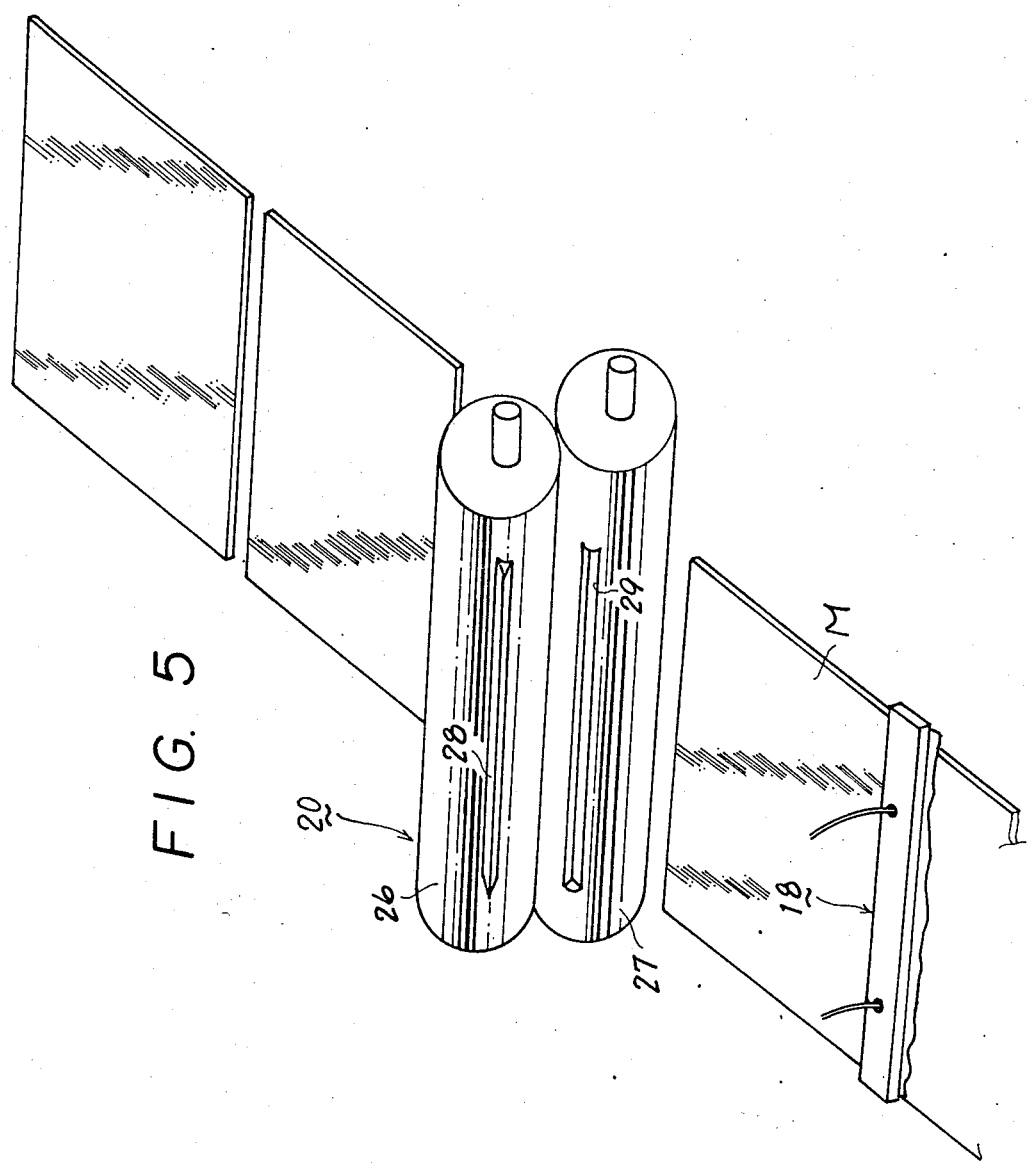

APPARATUS FOR PREPARATION OF A PROCESSING FOOD

BACKGROUND OF THE INVENTION

This invention relates to an apparatus for preparation of a processing food which prepares a processing food such as paste product like a fish-noodle, eggroll, salad food and the like continuously.

Heretofore, the preparation of paste products such as boiled fish paste, fish-noodle and the like, and eggroll is carried out as a home industry. For instance, the preparation of the fish-noodle is carried out by filling mashed fish paste materials in a container and then pushing out said mashed fish paste materials into a boiling water or a saline hot water from the said container. In other words, a plate having a plurality of suitably small holes is inserted to the opening end of the container, said container being filled with fish paste materials therein. Then, said fish paste materials are subjected to pressure mechanically or manually to be pushed into a boiling water or a saline hot water. After boiling said fish paste materials ripely, these materials are washed with water while cooling.

Such preparation of the processing food, however, has a disadvantageous problem which is impossible to practise, a continuous production or a mass product due to the independence of each step each other. Especially, in a step where the processing food is formed to a fixed shape, the continuous forming is difficult. Accordingly, a manual forming is carried out.

SUMMARY OF THE INVENTION

The object of this invention is to provide a preparing apparatus of a processing food which enables a continuous preparation of the processing food.

Another object of this invention is to provide a preparing apparatus of a processing food which enables to form the prepared processing food continuously.

In order to achieve the above object, the preparing apparatus of the processing food according to this invention is characterized in that a liquid processing food material is continuously fed onto a conveyor coated with edible oil thereon together with being heated with the aid of heating means, and is gelated to be sheet on the conveyor, said gelated sheet-like processing food being allowed to cut to a fixed shape by means of cutting means.

BRIEF DESCRIPTION OF THE DRAWINGS

FIG. 5 is a perspective view of further another example of a cutting means.

DETAILS DESCRIPTIONS OF THE INVENTION

Now, we will describe the details of this invention with referrence to an illustulated example as follows.

Figure 2:
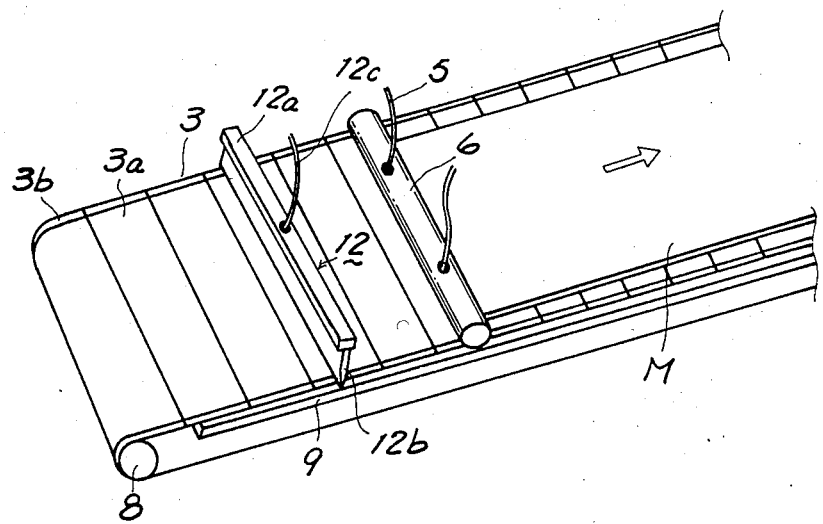
FIG. 2 is a perspective view of an oil applying means.

An extruder 2 is provided on the left side end of a frame 1 having a long side in the combination of a conveyor 3 provided in the longitudinal direction thereof on said frame 1. The extruder 2 is provided with extruding devices (not shown) such as a screw (not shown) and the like in a hopper 4 thereof, said hopper 4 being provided with an extruding nozzle 6 through a supplying hose 5 at the bottom thereof. The extruder 2 extrudes liquid processing food material M charged into the hopper 4 onto the conveyor 3 like a sheet. The conveyor 3 is installed endlessly between pulleys 8 at both ends thereof and travels between the pulleys 8 by the drive of a motor 7, thereby conveying the sheet-like processing food material extruded continuously from the extruding nozzle 6 in a right direction continuously. At the lower portion of the coneyor 3, heater blocks 9 such as electric heater, infrared rays heater etc. contacts with it to heat the conveyor 3 to 50° to 80° C. In order to prevent the heat transformation of said processing food material and increase the electric heat efficiency in such heating, steel plates 3a of the conveyor 3 are, as shown in FIG. 2, connected with a chain 3b. Further, above the conveyor 3 a steam spray tube 10 which ejects the steam is provided in the longitudial direction of the conveyor 3. The steam of the steam spray tube 10 is fed from the steam supplying tube 11 connected with steam source (not shown), whereby the steam is sprayed to the sheet-like processing food material M on the conveyor 3. Accordingly, the heating means are constituted by the heater block 9 and the steam spray tube 10, and the liquid processing food material M on the conveyor 3 is heated to be gelated by this heating means. By this gelation, the processing food materials, in the case of fish mashed materials, occur "a light bouncing force" to form a sheet-like boiled fish paste or a fish-noodle. Further, when the processing food material is eggs, an eggroll is formed like a sheet.

Figure 1:
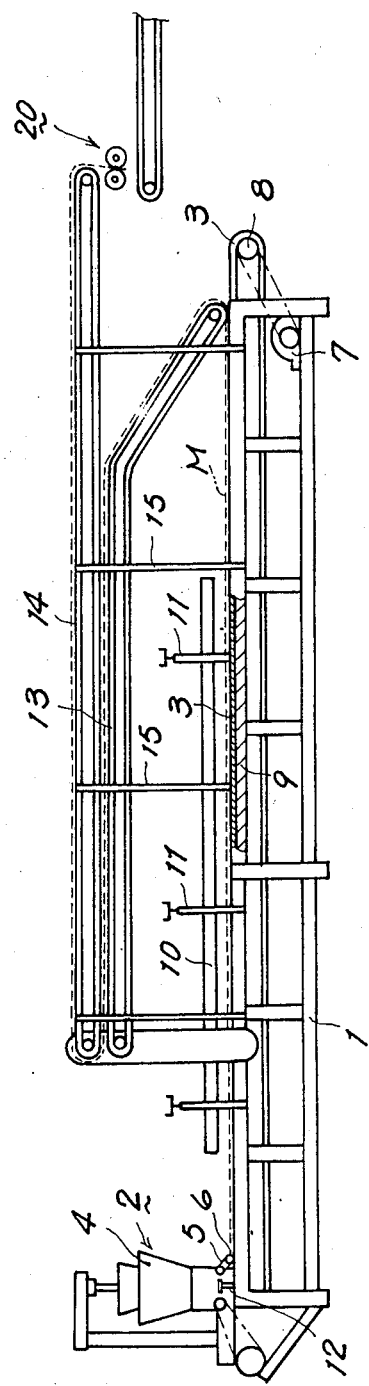
FIG. 1 is a whole side view of an example of a preparation apparatus according to this invention.

In FIG. 1 and FIG. 2, the numeral 12 is an oil applying means. The oil applying means 12 is adapted to coat an edible oil such as olive oil, corn oil, sesame oil, salad oil or the like on the conveyor 3 heated with heater 9, thereby preventing the processing food material M to be gelated on the conveyor 3 from scorching to said conveyor 3. and faciliating its tearing off from the conveyor 3. For this purpose, the oil applying means 12 is installed at the upper flow side of the extruding nozzle 6 by which the processing food material is fed. In this example, the oil applying means 12 consists of a hollow case frame 12a and a cloth body 12b which contacts with conveyor 3 hanging down from the case frame 12a. When the edible oil is fed into the case frame 12a through a hose 12c, said edible oil falls down through the cloth body 12b, thereby being applied to the surface of the conveyor 3. Further, a roller, a spray or the like can be used as an oil applying means 12.

The two cooling conveyors 13 and 14 are arranged above said conveyor 3. These cooling conveyors 13, 14 are latched at the upper portions of a strut 15 disposed in upright from the frame 1, the right side portion of said lower side cooling conveyor 13 being inclined so that the right end portion thereof may be attained near the end portion of said conveyor 3. The gelated sheet-like material on the conveyor 3 is transferred from the lower side cooling conveyor 13 to the upper side cooling conveyor 14 in order as shown with broken line in FIG. 1 and allowed to cool with air during the step of tranferring. Further, a cutting means 20 is provided at the end portion of the upper side cooling conveyor 14.

Figure 3:
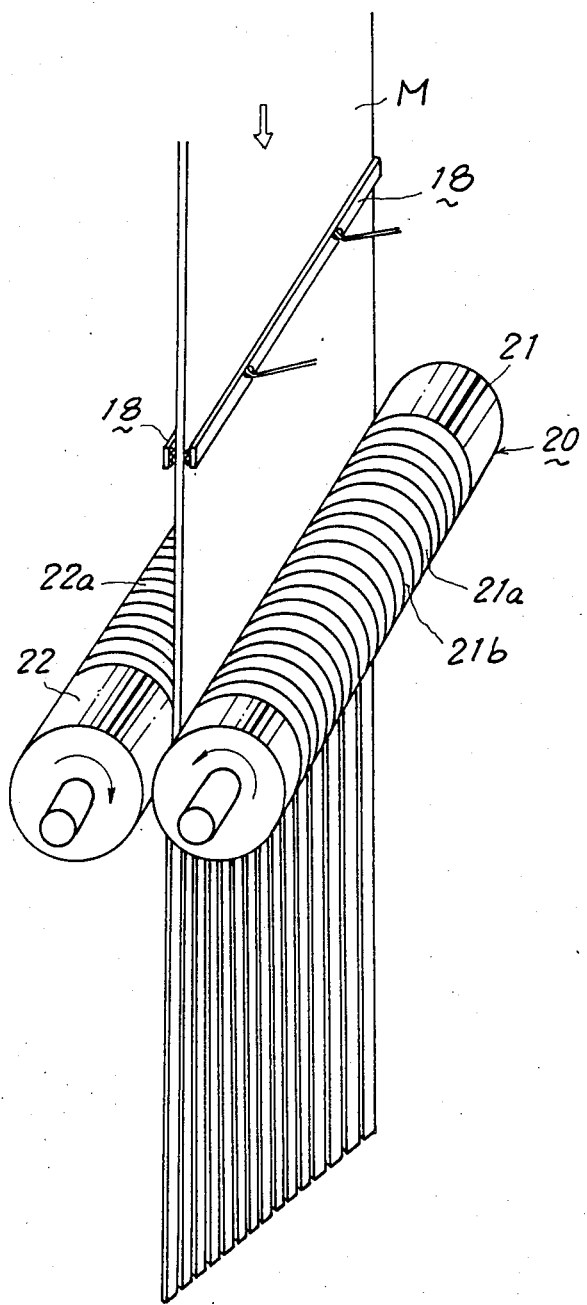
FIG. 3 is a perspective view of a cutting means.

The cutting means 20 consists of a pair of rollers 21 and 22, as shown in FIG. 3, each roller of a pair of rollers 21 and 22 being rotatively supported by a bearing or the like (not shown) around each axis shaftline parallel each other. At each periphery of the rollers 21, 22, parallel grooves 21a and 22a which extend toward a direction intersects perpendicularly with each axis shaftline thereof are formed respectively.

In this case, each protruding portion 21b between grooves 21a, 21a of one roller 21 is constructed so as to protrude into each groove 22a of another roller 22. Accordingly, when the gelated sheet-like material M passes the rollers 21 and 22, said material M is slenderly cut by the grooves of rolls 21 and 22 and protruding portion, thereby being able to obtain the processing food having a slenderly long shape. The numeral 18 is a wet providing means installed at the upper flow side with respect to the supplying direction of the cutting means 20. An edible oil or water is fed into the wet providing means 18, and the fed edible oil or water acts so that said fed edible oil or water may coat the surface and the back of the sheet-like material M. By such coating, the adhesion of the material to the rollers 21 and 22 at the time of slenderly cutting of the material can be prevented and restrained from being bitten to the rollers 21 and 22, thereby being enable the continuous slenderly cutting of the sheet-like material.

Then, we will describe the operation of the above apparatus. When the processing food to be prepared is a boiled fish paste or fish-noodle, salt, sugar, white of egg etc. are mixed in the mashed fish material to obtain a liquid material. When the processing food to be prepared is an eggroll, flavorings such as salt, sugar, white of egg etc. are mixed therein to obtain a liquid material. This liquid processing food material is charged into the extruder 2 and then extruded from the extruding nozzle 6 onto the conveyor 3 like a sheet. Since the conveyor 3 is previously heated with heater block 9 and the steam spray 10 is provided on the transferring way of the conveyor 3, the liquid processing food material is gelated to obtain a fixed hardness by these heating means. Accordingly, the processing food material will retain its form by this gelation. Then, said processing food material is transferred and allowed to cool by cooling conveyors 13, 14 and cut slenderly by a cutting means 20.

Figure 4:
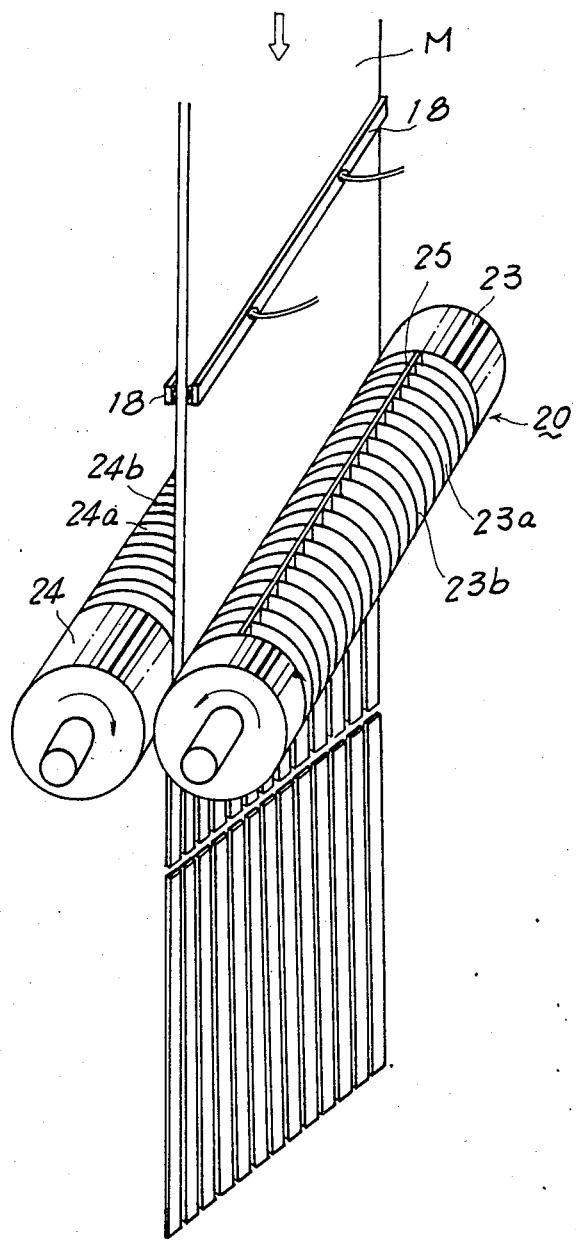
FIG. 4 is a perspective view of another example of a cutting means.

FIG. 4 is a perspective view of another example of the cutting means 20. This cutting means 20 consists of a pair of rollers 23 and 24 wherein axis shaftlines of said rollers are parallel each other, and the material is slenderly cut by the grooves 23a, 24a and protruding portions 23b, 24b having directions intersect perpendicularly with axis shaftlines respectively. Further, cutting edges 25 are formed toward the parallel direction to the axis shaftline at the periphery of the roller 23. Accordingly, when the roller 23 performs one rotation, the cutting edge 25 contacts with material by only one time, thereby being able to cut the material slenderly and to cut it toward a direction intersects perpendicularly with the longitudinal direction simultaneously.

FIG. 5 is a perspective view of further another example of the cutting means 20. This is an example wherein the cutting means 20 is applicable to prepare eggrolls, salad foods and the like continuously. In the example, the rollers 26 and 27 are arranged in the horizontal direction. At the periphery of the roller 26, the cutting edges 28 extend to the parallel direction with respect to the axis shaftline, while at the periphery of another roller 27, the cutting groove 29 into which the cutting edges 28 are get in are formed in the same direction. The processing food M is formed previously to be sheet by the heated conveyor and transferred to a wet providing means 18 (apparatus for giving the wet to the processing food), where the processing food is coated with water or an edible oil at the surface and back thereof. Then, when it passes between rollers 26 and 27, it is cut to a fixed length with the aid of cutting edges 28 and cutting groove 29 to form each processing food. Further, such cutting edge 28 and cutting groove 29 may be formed in plurality at the periphery of the rollers 26 and 27 to cut it a appropriate length according to the kind and the use of the processing food.

Further, various kinds of modifications are possible to this invention. The cutting means may be formed to have scooping protruding portion formed so as to protrude to the periphery of one roller, and scooping groove bored at the periphery of another roller. Further, the sheet-like processing food can be cut and formed to a fixed shape feeding it to the roller by forming said scooping prutrusion and said scooping prutruding groove, for instance, geometrical shapes such as star, ellipse and the like, and natural shapes such as fish, flower, leaf, animal and the like. Furthermore, said wet providing means may be also a spray or a roller. Still further, the coating of water or edible oil may be applied to the periphery of the roller without coating to the processing food.

Accordingly, according to this invention described above, the processing food can be continuously produced because the liquid processing food material continuously fed is gelated to be sheet on the conveyor and the gelated material is allowed to cut to the fixed shape continuously.

What I claim is:

1. An apparatus for preparation of a processing food material comprising:
   means for extruding a continuous sheet of a liquid processing food material capable of gelating by heat,
   a conveyor having a conveyor surface for receiving and feeding the extruded continuous sheet of liquid processing food material,
   oil applying means supplied with a source of edible oil for coating edible oil on the conveyor surface,
   heating means for causing gelation of the processing food material on the conveyor by heating said conveyor, and
   cutting means for cutting the gelated sheet of material fed by said conveyor to a fixed shape, said cutting means including of a pair of rollers which rotate around axis shaftlines parallel to each other, one roller of said pair of rollers being provided with parallel grooves intersecting perpendicularly with the axis shaftline at the periphery of the roller, while the other roller being provided with protruding portions which register with said grooves respectively at the periphery of the roller.

2. An apparatus for preparation of a processing food material comprising:
   means for extruding a continuous sheet of a liquid processing food material capable of gelating by heat,
   a conveyor having a conveyor surface for receiving and feeding the extruded continuous sheet of liquid processing food material,
   oil applying means supplied with a source of edible oil for coating edible oil on the conveyor surface,
   heating means for causing gelation of the processing food material on the conveyor by heating said conveyor, and
   cutting means for cutting the gelated sheet of material fed by said conveyor to a fixed shape, said cutting means including of a pair of rollers which rotate around axis shaftlines parallel to each other, one roller of said pair of rollers being provided with parallel grooves intersecting perpendicularly with the axis shaftline at the periphery of the roller thereof, while the other roller being provided with protruding portions at the periphery of the roller thereof, and further a cutting edge parallel to said axis shaftlines being provided on the periphery of one roller of the pair.

3. An apparatus for preparation of a processing food material comprising:
  means for extruding a continuous sheet of a liquid processing food material capable of gelating by heat,
  a conveyor having a conveyor surface for receiving and feeding the extruded continuous sheet of liquid processing food material,
  oil applying means supplied with a source of edible oil for coating edible oil on the conveyor surface,
  heating means for causing gelation of the processing food material on the conveyor by heating said conveyor, and
  cutting means for cutting the gelated sheet of material fed by said conveyor to a fixed shape, said cutting means including of rollers which rotate around axis shaftlines parallel each other, one roller of said pair of rollers being provided with a protruding cutting edge extending parallel with the axis shaftline thereof at the periphery of the roller, while the other roller of said pair of rollers being provided with a cutting groove into which said protruding cutting edge registers being formed at the periphery of the roller thereof.

4. An apparatus for preparation of a processing food material according to claims 1, 2 or 3 wherein said processing food material is a fish paste.

5. An apparatus for preparation of a processing food material according to claims 1, 2 or 3 wherein said heating means includes a heater block which contacts with said conveyor.

6. An apparatus for preparation of a processing food material according to claims 1, 2 or 3 wherein said heating means includes a steam spraying tube which ejects steam therefrom.

7. An apparatus for preparation of a processing food according to claim 5 wherein said heating means includes a heater block which contacts with said conveyor.

8. An apparatus for preparation of a processing food material according to claims 1, 2 or 3 wherein wetting means is provided adjacent to said cutting means for coating a liquid on said gelated material prior to cutting thereof.

* * * * *